(12) United States Patent
Mahmoud et al.

(10) Patent No.: US 9,772,412 B2
(45) Date of Patent: Sep. 26, 2017

(54) LAND STREAMER SURVEYING USING MULTIPLE SOURCES

(71) Applicant: King Abdullah University of Science and Technology, Thuwal (SA)

(72) Inventors: Sherif Mahmoud, Thuwal (SA); Gerard Schuster, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 319 days.

(21) Appl. No.: 14/298,108

(22) Filed: Jun. 6, 2014

(65) Prior Publication Data

US 2014/0362665 A1   Dec. 11, 2014

Related U.S. Application Data

(60) Provisional application No. 61/831,696, filed on Jun. 6, 2013.

(51) Int. Cl.
*G01V 1/00* (2006.01)
*G01V 1/09* (2006.01)
*G01V 1/20* (2006.01)

(52) U.S. Cl.
CPC .............. *G01V 1/003* (2013.01); *G01V 1/09* (2013.01); *G01V 1/201* (2013.01)

(58) Field of Classification Search
CPC .. G01V 1/09; G01V 1/003; G01V 2210/1295; G01V 2210/1425; G01V 2210/10; G01V 2210/121; G01V 1/16
See application file for complete search history.

(56) References Cited

U.S. PATENT DOCUMENTS 3,301,345 A * 1/1967 Carder ................. G01V 1/003
                                                    181/111
3,923,121 A * 12/1975 Kruppenbach ........ G01V 1/201
                                                    181/108
(Continued)

FOREIGN PATENT DOCUMENTS

EP    2048520    4/2009
EP    2270546    1/2011
(Continued)

OTHER PUBLICATIONS

Long A., May 2010,"An overview of seismic azimuth for towed streamers", The Leading Edge, vol. 29, No. 5, pp. 512-523.
(Continued)

*Primary Examiner* — Hovhannes Baghdasaryan
(74) *Attorney, Agent, or Firm* — Thomas | Horstemeyer LLP; Todd N. Deveau; Randy R. Schoen

(57) ABSTRACT

Various examples are provided for land streamer seismic surveying using multiple sources. In one example, among others, a method includes disposing a land streamer in-line with first and second shot sources. The first shot source is at a first source location adjacent to a proximal end of the land streamer and the second shot source is at a second source location separated by a fixed length corresponding to a length of the land streamer. Shot gathers can be obtained when the shot sources are fired. In another example, a system includes a land streamer including a plurality of receivers, a first shot source located adjacent to the proximal end of the land streamer, and a second shot source located in-line with the land streamer and the first shot source. The second shot source is separated from the first shot source by a fixed overall length corresponding to the land streamer.

15 Claims, 7 Drawing Sheets

(56) References Cited

U.S. PATENT DOCUMENTS

| | | | |
|---|---|---|---|
| 5,508,914 A * | 4/1996 | Lee | G01V 1/362 367/68 |
| 7,453,765 B2 | 11/2008 | Ikelle | |
| 7,710,821 B2 | 5/2010 | Robertsson et al. | |
| 7,826,307 B2 | 11/2010 | Kitchenside | |
| 7,917,317 B2 | 3/2011 | McKeon | |
| 7,987,054 B2 | 7/2011 | Anatoly | |
| 8,280,695 B2 | 10/2012 | Neelamani et al. | |
| 8,300,498 B2 | 10/2012 | Hegge et al. | |
| 8,395,965 B2 | 3/2013 | Thomson | |
| 8,437,218 B2 | 5/2013 | Dragoset, Jr. et al. | |
| 2007/0189117 A1 | 8/2007 | Robertsson et al. | |
| 2008/0006091 A1 | 1/2008 | McKeon | |
| 2008/0162051 A1 | 7/2008 | Ikelle | |
| 2009/0092007 A1 | 4/2009 | Kitchenside | |
| 2009/0288823 A1 | 11/2009 | Baumstein | |
| 2010/0110830 A1 | 5/2010 | Thomson | |
| 2010/0135114 A1 | 6/2010 | Teague et al. | |
| 2010/0161235 A1 | 6/2010 | Ikelle | |
| 2010/0246324 A1 | 9/2010 | Dragoset, Jr. et al. | |
| 2010/0302906 A1 | 12/2010 | Liu | |
| 2010/0329079 A1 | 12/2010 | Hegge et al. | |
| 2011/0128817 A1 | 6/2011 | Keers | |
| 2011/0144935 A1 | 6/2011 | McKeon | |
| 2011/0147004 A1 | 6/2011 | Neelamani et al. | |
| 2011/0199858 A1 | 8/2011 | Otnes et al. | |
| 2011/0317521 A1 | 12/2011 | Dragoset, Jr. et al. | |
| 2012/0041682 A1 | 2/2012 | Ramirez-Perez et al. | |

FOREIGN PATENT DOCUMENTS

| | | |
|---|---|---|
| EP | 2353036 | 8/2011 |
| EP | 2414865 | 2/2012 |
| EP | 2435860 | 4/2012 |
| EP | 2537049 | 12/2012 |
| WO | WO2005019868 | 3/2005 |
| WO | WO2007137092 | 11/2007 |
| WO | WO2008008052 | 1/2008 |
| WO | WO2008053135 | 5/2008 |
| WO | WO2008081156 | 7/2008 |
| WO | WO2008112036 | 9/2008 |
| WO | WO2009051899 | 4/2009 |
| WO | WO2009051900 | 4/2009 |
| WO | WO2010065653 | 6/2010 |
| WO | WO2010117499 | 10/2010 |
| WO | WO2010138409 | 12/2010 |
| WO | WO2011103297 | 8/2011 |
| WO | WO2012005921 | 1/2012 |
| WO | WO2012021218 | 2/2012 |
| WO | WO2012074612 | 6/2012 |

OTHER PUBLICATIONS

McGinn A., B. Duijndam, Nov. 1998, "Land seismic data quality improvements", The Leading Edge, vol. 17, No. 11, pp. 1570-1577.

Pugin A J. M., Timothy H. Larson, Steven L. Sargent, John H. McBride, Christopher E. Bexfield, Jul. 2004, "Near-surface mapping using SH-wave and P-wave seismic land-streamer data acquisition in Illinois", U.S. The Leading Edge 2004, vol. 23, No. 7, pp. 677-682.

van der Veen M., Alan G. Green, Jul. 1998, "Land streamer for shallow seismic data acquisition: Evaluation of gimbal-mounted geophones", Geophysics, vol. 63, No. 4, pp. 1408-1413.

van der Veen M., R. Spitzer, A. G. Green, P. Wild, "Design and application of a towed landstreamer system for cost-effective 2-D and pseudo-3-D shallow seismic data acquisition", Geophysics Mar 2001, vol. 66, No. 2, pp. 482-500.

Hanafy, Sh. M. and O. Al-Hagan, Oct. 2012, "Super-virtual Refraction Interferometry: an Engineering Field Data Example", Near Surface Geophysics, vol. 10, No. 5, pp. 443-449.

Bharadwaj et al., "Super-virtual Refraction Interferometry: Theory", Sep. 2011, Society of Exploration Geophysicists (SEG) Annual meeting proceedings, pp. 3809-3813.

* cited by examiner

LAND STREAMER SURVEYING USING MULTIPLE SOURCES

CROSS REFERENCE TO RELATED APPLICATIONS

This application claims priority to and the benefit of U.S. provisional application entitled "LAND STREAMER SURVEYING USING MULTIPLE SOURCES" having Ser. No. 61/831,696, filed Jun. 6, 2013, which is hereby incorporated by reference in its entirety.

BACKGROUND

Seismic surveying generates subsurface images that may be utilized for a variety of purposes. Land streamers can be used to gather seismic data for shallow land surveys. Because of weight and friction, portable land streamers include a relatively short run of closely spaced geophones which can be pulled by a vehicle during a survey.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
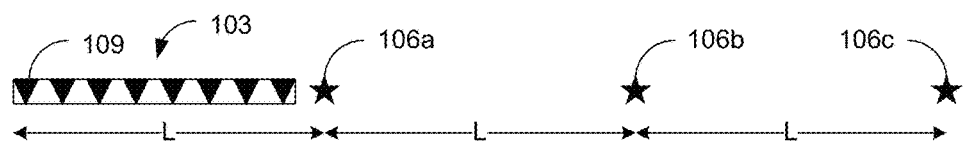
FIGS. 1 and 2 are graphical representations of an example of a land streamer with a plurality of shot points in accordance with various embodiments of the present disclosure.

Disclosed herein are various embodiments related to land streamer seismic surveying using multiple sources. Reference will now be made in detail to the description of the embodiments as illustrated in the drawings, wherein like reference numbers indicate like parts throughout the several views.

To collect field seismic data, multiple receivers are positioned in a study area and connected to a recording unit. The use of land streamers, where the receivers and cables are already assembled, can speed up this process. However, the length of a land streamer is typically limited by logistical issues such as total weight, strength of the material used to make the streamer, surface friction, etc. With the use of a single source, the length of the land streamer will limit the maximum penetration depth of the seismic waves. However, the use of multiple sources can increase the effective length of the land streamer and thus the penetration depth of the seismic waves. The physical length of the land streamer remains the same but by locating the sources at offsets equal to a multiple of the length of the land streamer, the effective length of the land streamer can be increased by two or more times. Super-virtual interferometry (SVI) processing can be used to increase the signal-to-noise ratio (SNR) of far-offset refraction arrivals. These refraction arrivals can be used for tomography imaging of the subsurface velocity field. The enhancement of the SNR means that fewer stacks per shot point may be employed, which can expedite the execution of the survey.

Referring to FIG. 1, shown is a graphical representation of an example of a land streamer 103, having a length L, with a plurality of shot points 106 separated by the length (L). The maximum offset between the shot point 106a adjacent to the land streamer 103 and the last receiver point 109 in a land streamer 103 is equal to L. Data acquisition is maximized by using a separation length of L. Separation lengths of less than L can result in acquisition of overlapping data, while separations of greater than L can result in gaps in the captured data. While some variation can be tolerated, accurate separation between receivers and shot points can improve data collection and processing.

Using a single shot point 106a, the maximum depth of penetration will range between L/4 and L/5 in the case of a refraction application. The length of the land streamer can be, e.g., in the range of 10 m to 100 m, or longer. However, increasing the length of the land streamer is not always possible due to its weight and logistical issues of dragging it on rough ground surface. To increase the maximum offset of data recorded by the land streamer 103 without physically increasing the length of the land streamer 103, an extra source or shot point 106b located at an offset equal to L from the existing source location or shot point 106a. For example, the effective length of the land streamer 103 can be doubled with two shot points 106a and 106b or tripled with three shot points 106a, 106b and 106c. The additional shot points 106b and 106c are located at offsets of L and 2L from the first shot point 106a, respectively.

Data collected using the land streamer 103 with more than one source point 106 can be used to reconstruct the subsurface velocity model for greater depths than would be possible with a single shot point 106a. For example, by doubling the effective length, the depth may be increased to 2L/4 or 2L/5. In addition, because multiple shot points 106 allow for faster data collection, the velocity model may be determined in almost real time without loss of accuracy. The SVI processing also allows us to use few stacks per shot point 106 to enhance the SNR. The velocity model can be used to find static corrections for reflection data.

Figure 2:
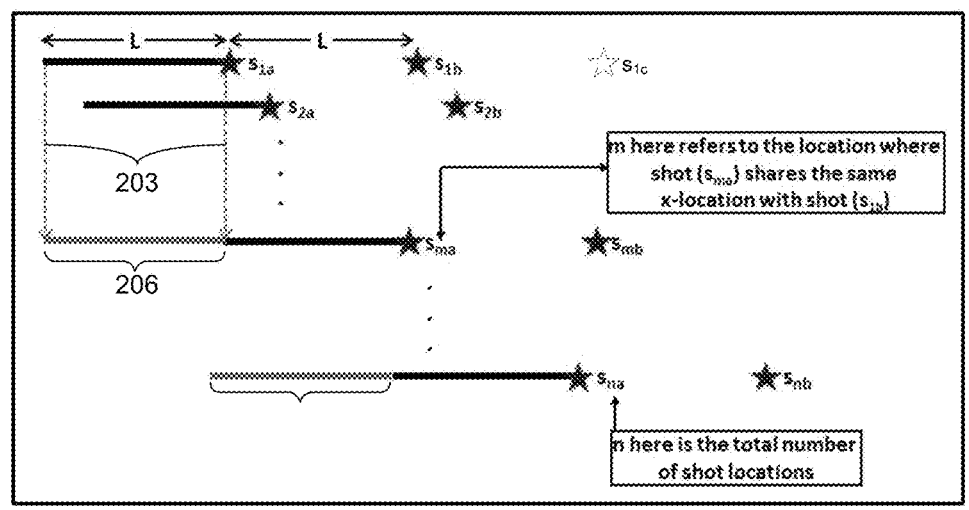

Doubling the effective length of the land streamer 103 is now discussed with reference to FIG. 2. While doubling the effective length of the land streamer 103 is discussed for simplicity, the same approach can be used for increasing the effective length of the land streamer 103 by higher multiples of the land streamer length. To apply the suggested geometry, a land streamer 103 with length L and two seismic sources (or shot points 106) are used. In the example of FIG. 2, the first source location $s_{1a}$ is located next to a proximal end of the land streamer 103, while the second source location $s_{1b}$ is located at an offset equal to L from the first source location $s_{1a}$.

Initially, a shot is fired at source location $s_{1a}$ and data of a first shot gather is recorded and then a shot is fired at source location $s_{1b}$ and data of a second shot gather is recorded. Next, the sources are moved an incremental amount to source locations $s_{2a}$ and $s_{2b}$. As the position of the land streamer 103 is fixed with respect to the source locations, it is also moved by the incremental amount. Shots are then sequentially fired at source locations $s_{2a}$ and $s_{2b}$ and data of the corresponding shot gathers is recorded. This procedure is repeated for the remaining increments until shot gather data is recorded for the last source locations $s_{na}$ and $s_{nb}$.

Figure 3:
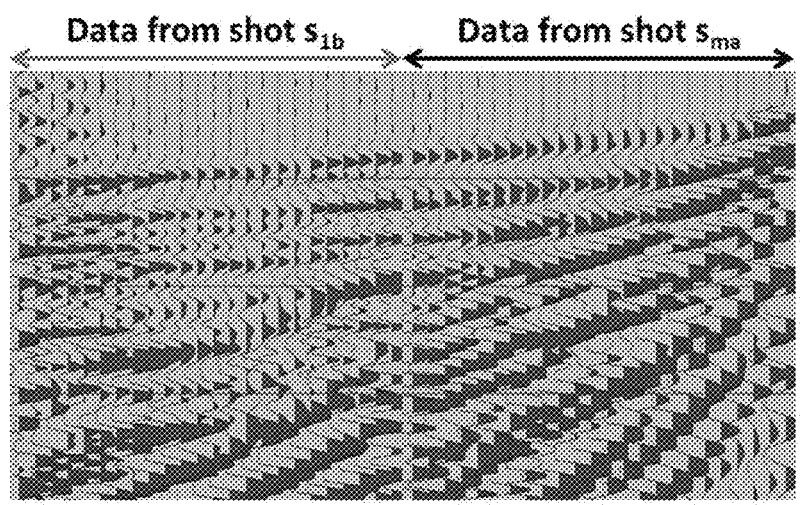
FIG. 3 is an example of an extended shot gather in accordance with various embodiments of the present disclosure.

As shown in FIG. 2, there is a location (m) where the source location $s_{ma}$ coincides with the source location $s_{1b}$. The vertical dashed lines 203 refer to moving the far-offset traces 206 recorded from source location $s_{1b}$ next to the near-offset traces recorded from source location $s_{ma}$ to form the shot gather at location m with an effective receiver length equal to 2L. At location m, the far-offset traces 206 are actually the far-offset traces recorded from source location $s_{1b}$. Joining the far-offset traces of source location $s_{1b}$ with the near-offset traces of source location $s_{ma}$ will produce full-trace coverage. FIG. 3 shows an example of the extended shot gather formed by concatenating the two shot gathers together, one from the near-offset traces of source location $s_{ma}$ and the other for the far-offset traces of source location $s_{1b}$. All shots located to the left of source location $s_{ma}$ will enjoy full extended cable coverage as if the cable length was 2L rather than L.

To triple the length of the land streamer 103, a third source (at source locations $s_{Xc}$, where X=1, 2, ... n) is added. In this case, the location m, where the full trace coverage starts, is now located at the source offset of 2L. In the example of FIG. 2, the near-offset traces recorded from source location $s_{na}$ and the far-offset traces recorded from source locations $s_{mb}$ and $s_{1c}$ may be concatenated to form an extended shot gather with an effective length of 3 L.

Figure 4:
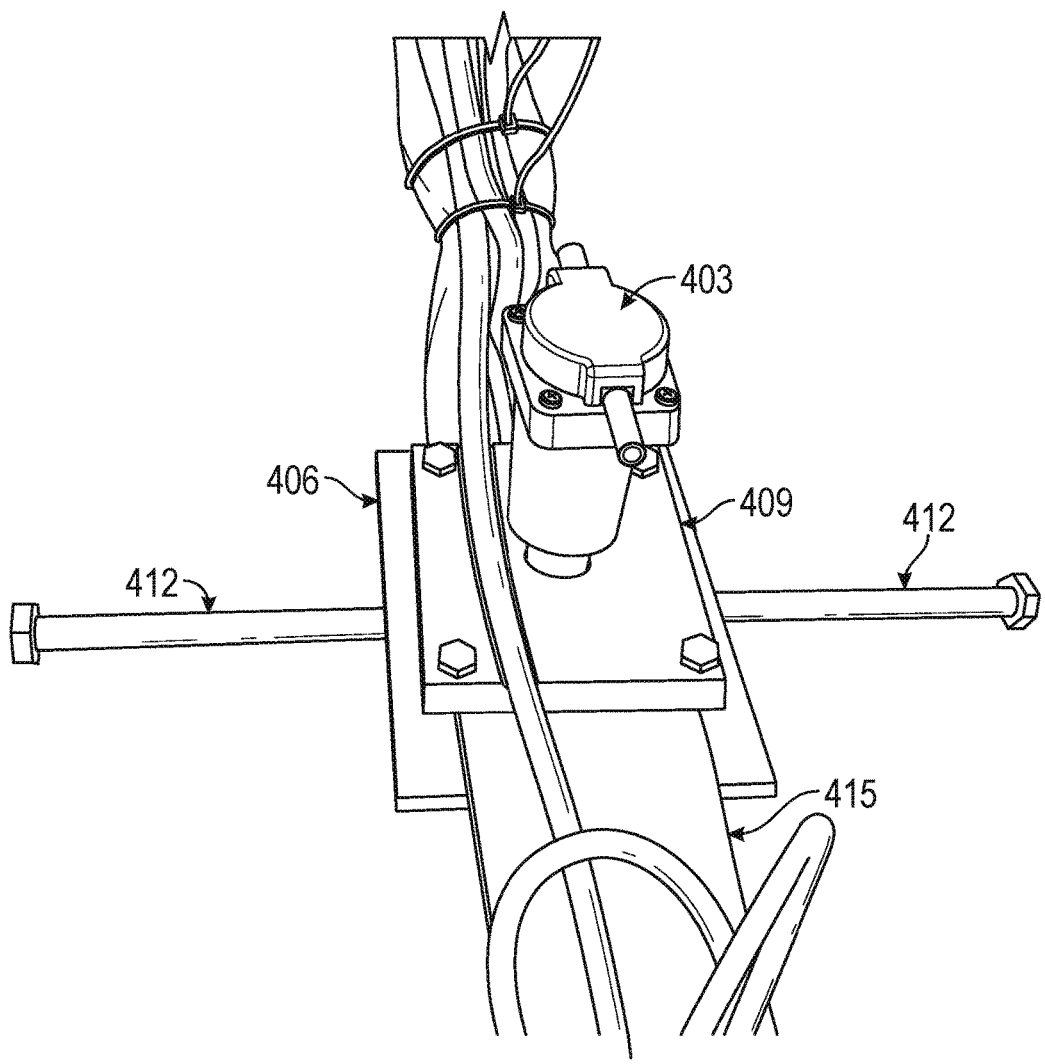
FIGS. 4 and 5 are images of an example of a land streamer in accordance with various embodiments of the present disclosure.

For field testing, a land streamer system was assembled using a plurality of spikeless 40 Hz P-wave receivers, which were connected to a Geometrics Geode recording system. Referring to FIG. 4, shown is an image of a receiver 403 used in the land streamer 103 of the land streamer system. The receivers 403 were secured together at equal intervals (or approximately equal intervals) to maintain spacing between the receivers 403 of the land streamer 103. The receivers 403 are mounted on metallic bases, which include a lower plate 406, an upper plate 409, and side wings 412 to increase the stability during data acquisition. The lower plate 406 and side wings 412 may be made of iron and the upper plate 409 may be made of aluminum. The receivers 403 can be secured together using strapping or other appropriate separation device that can handle the strain experienced, while maintaining the relative positioning between the receivers, during movement of the land streamer system. In the example of FIG. 4, a fire hose 415 was fixed between the lower plate 406 and the upper plate 409 to connect the receivers together at fixed intervals. For example, the land streamer 103 of FIG. 5 included 48 receivers with a receiver interval of about 127.5 cm. Other numbers of receivers can also be utilized.

Figure 5:
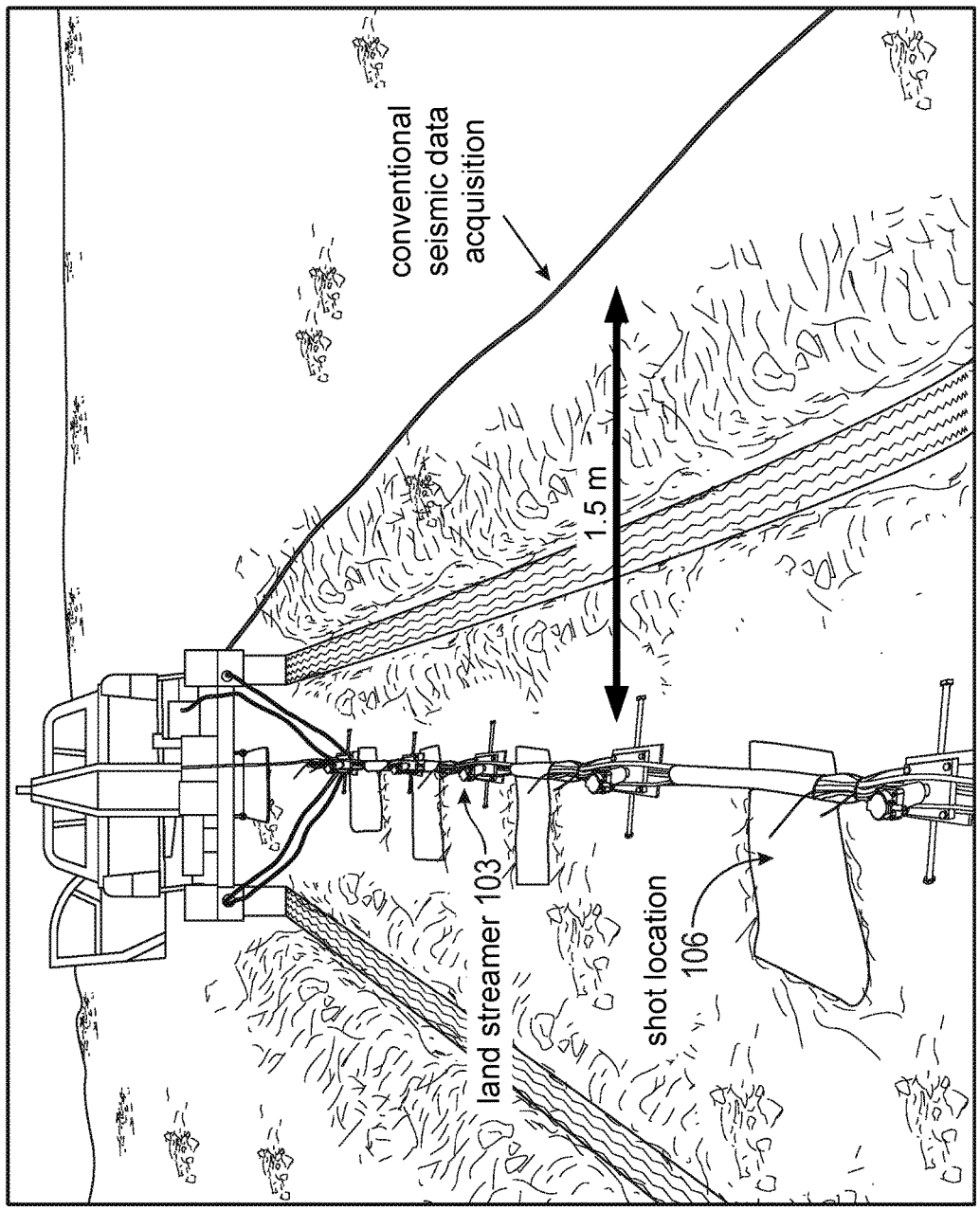
Figure 6:
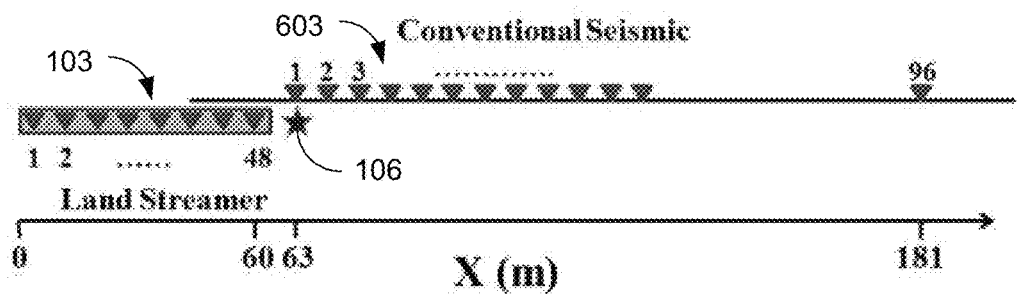
FIG. 6 is a graphical representation of the geometry of a field test for a land streamer and conventional seismic data acquisition in accordance with various embodiments of the present disclosure.

The land streamer 103 (including 48 channels) was used to collect seismic data at Qademah Village, north of Jeddah, KSA. A conventional seismic profile was also conducted next to the land streamer profile as illustrated in FIG. 5. The conventional seismic data acquisition consisted of 96 channels with a 127.5 cm receiver interval. A total of 96 shot gathers were collected with the conventional seismic data acquisition where one shot is located at each receiver location. In addition, 96 shots were also recorded using the land streamer 103. Referring to FIG. 6, shown is an example of the geometry of the field test for the 48 receivers of the land streamer 103 and the 96 receivers of the conventional seismic data acquisition 603. The receivers of the conventional seismic data acquisition 603 were fixed in position, while the receivers of the land streamer 103 could be moved forward with the shot. For shot gather #1, receiver #1 in the land streamer 103 was located at an offset of 0 m, receiver #48 in the land streamer 103 was located at an offset of 60 m. The shot point (or source location) 106 for shot #1 was located at an offset of 63 m. Receiver #1 in the conventional seismic data acquisition 603 was located at an offset of 63 m, and receiver #96 in the conventional seismic data acquisition 603 was located at an offset of 181 m.

Traces from the land streamer system and those from the conventional seismic data acquisition may be compared to illustrate the effectiveness of the use of multiple sources. With regard to installation time, it takes much less installation time in the field for the land streamer system, relative to conventional seismic data acquisition, because the receivers and cables are already assembled and no receiver planting is required. During the field testing, setup of the land streamer system took about 20 minutes compared to about 120 minutes to plant the receivers and connect the 96 channels to the recording system for conventional seismic data acquisition.

Figure 7A:
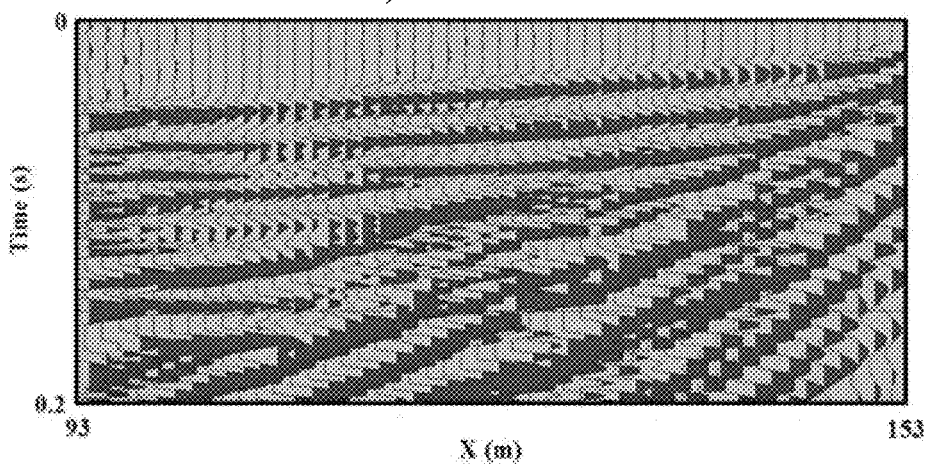
FIGS. 7A and 7B are examples of shot gathers for conventional seismic data acquisition and a land streamer system, respectively, in accordance with various embodiments of the present disclosure.
Figure 7B:
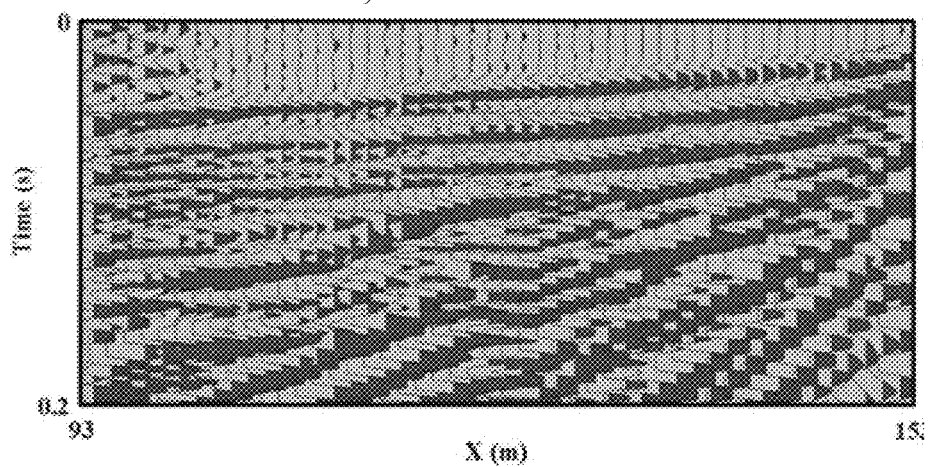

Referring to FIGS. 7A and 7B, shown are the shot gather for shot #74 for both the conventional seismic data acquisition and the land streamer system, respectfully. The shot gathers of FIGS. 7A and 7B show very good agreement. Both first arrivals and later arrivals are very similar. The land streamer shot gather of FIG. 7B shows a lower SNR, especially before the first break; however, the first break and later arrivals are easily recognized. To increase the SNR of the first breaks, the refraction interferometry method can be employed as previously discussed.

Figure 8:
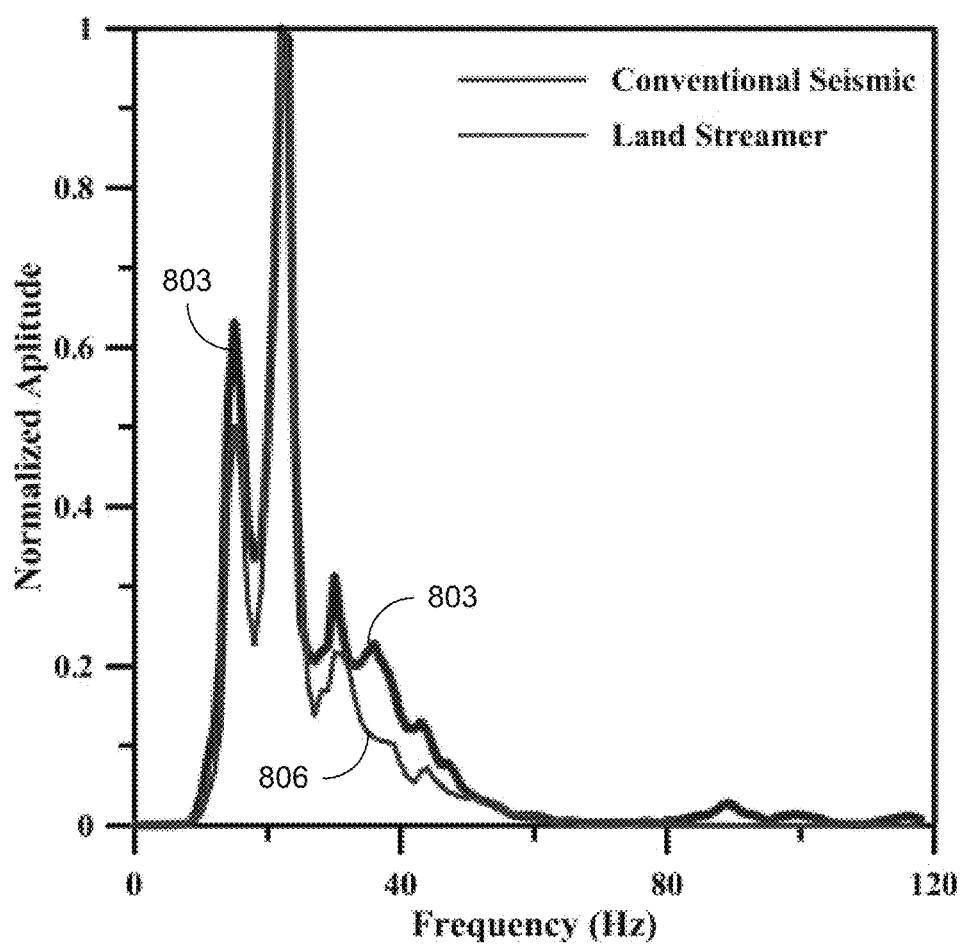
FIG. 8 is an example of the frequency spectrum of the shot gather data for the conventional seismic data acquisition and the land streamer system in accordance with various embodiments of the present disclosure.

FIG. 8 shows an example of the frequency spectrum of the shot gather data for both the conventional seismic data acquisition (curve 803) and the land streamer system (curve 806). The amplitude spectra of the conventional seismic and land streamer data sets are shown in FIG. 8. Here, the normalized summation of amplitude spectra is shown for all traces in shot gather #74. Both data sets show almost the same frequency content with peaks at the same frequency values (e.g., 22 Hz), however, the conventional seismic data set contains more energy especially at frequencies higher than 30 Hz. This may be attributed to better coupling with the ground by the receivers used in the conventional seismic data acquisition, which will record high frequency signals with less noise than the receivers of the land streamer.

Figure 9A:
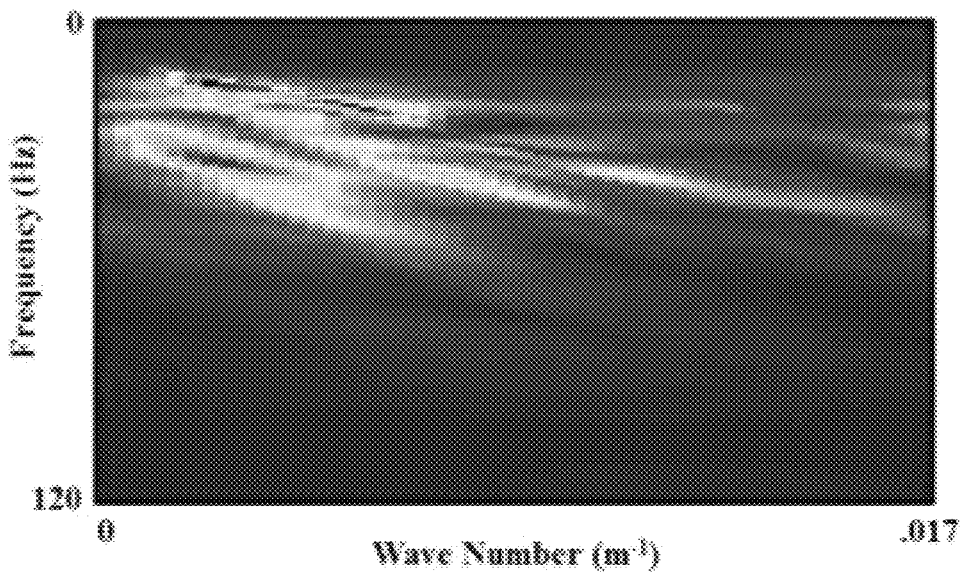
FIGS. 9A and 9B are examples of traces in the F-K domain for the conventional seismic data acquisition and the land streamer system, respectively, in accordance with various embodiments of the present disclosure. The F-K domain is a reference framework using frequency (f in Hz) and wavenumber (k, the reciprocal of wavelength or $m^{-1}$).
Figure 9B:
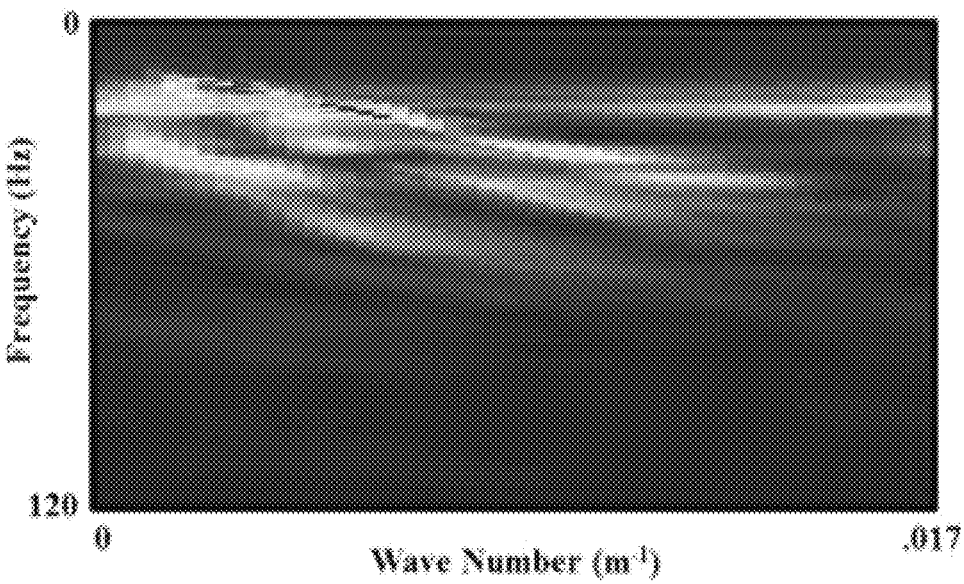

Comparison of the traces in the F-K domain is also illustrated in FIGS. 9A and 9B, which correspond to the conventional seismic data acquisition and the land streamer system, respectively. Shot gather #74 for both the conventional seismic and land streamer data sets were converted to the F-K domain. Both spectra show that the frequency content of both data sets is similar. The minor differences between the spectra in FIGS. 9A and 9B may be due to the better coupling with the ground of the receivers used in the conventional seismic data acquisition. Since the initial arrivals for both data sets are very similar as shown in FIGS. 7A-7B, 8, and 9A-9B, then inverting them using early arrival waveform inversion (EWI) should produce a similar velocity tomogram.

Figure 10:
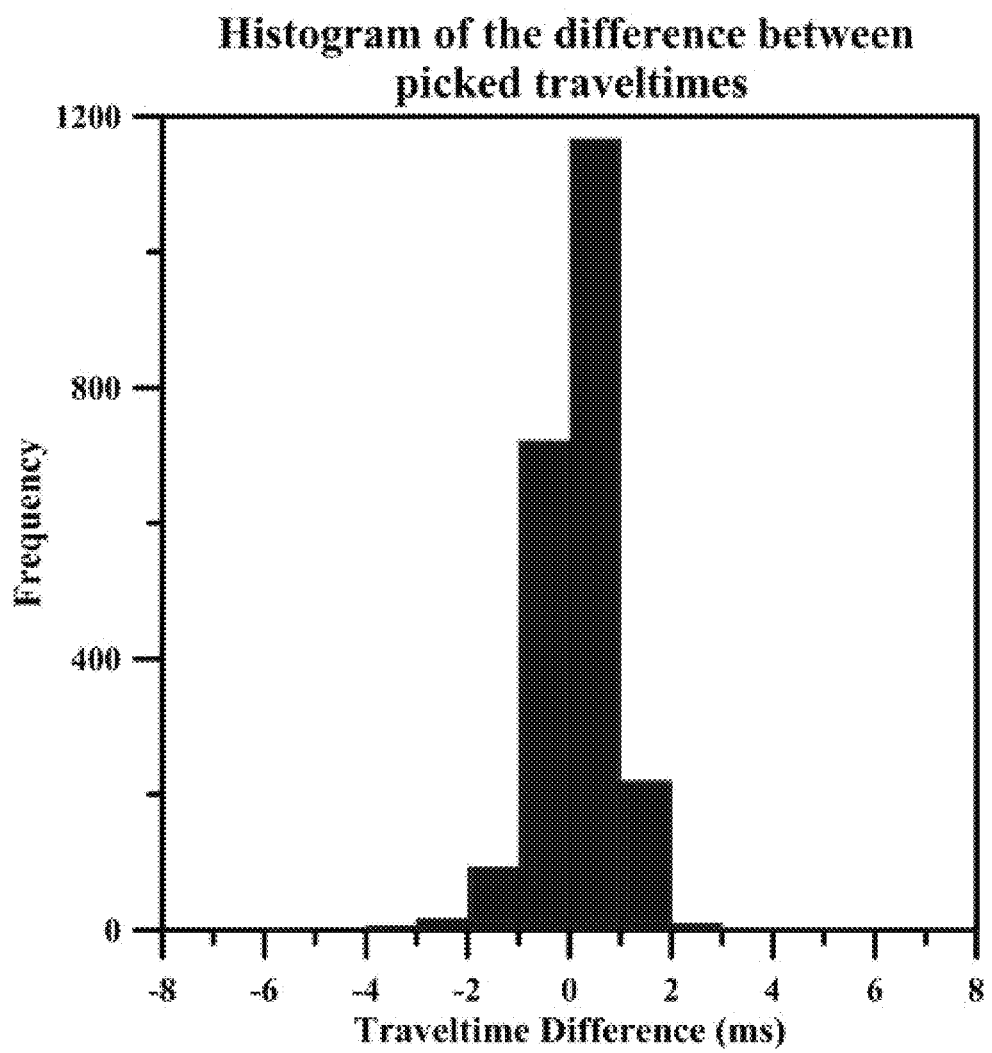
FIG. 10 is an example of a histogram illustrating the difference between first arrival traveltime picks for the conventional seismic data acquisition and the land streamer system in accordance with various embodiments of the present disclosure.

Referring next to FIG. 10, shown is an example of a histogram illustrating the difference between first arrival traveltime picks of both the conventional seismic and land streamer data sets. The first arrival traveltimes for both data sets were compared to one another. The two types of traveltime picks agree with one another to within about ±4 ms. This is much smaller than T/4, where T=45 ms is the dominant period of the source wavelet. This close agreement suggests that the associated traveltime tomograms should be similar.

An acquisition geometry to increase the effective length of land streamers 2 or more times by using more than one source located at offsets equal to 2 or more times the original length of the streamer has been described. The SNR of the far-offset refractions can be boosted using refraction interferometry. Field data was recorded to show the feasibility of this approach and to compare the land streamer traces to those recorded by conventional planted receivers. First arrival traveltimes for both data sets were picked and compared to one another and a first-arrival traveltime tomogram for each data set was computed to compare the resolution and depth of investigation of each data set. Use of the land streamer with multiple sources can provide a fast method for accurately estimating shallow velocity models for statics corrections and engineering applications.

Two dimensional seismic imaging may be obtained using shots that are in-line with the land streamer 103. As shown in FIG. 5, the source (e.g., a weight drop) may be mounted on the vehicle pulling the land streamer 103. In the example of FIG. 5, the source is mounted on a trailer to which the land streamer 103 is attached. The additional sources may be mounted on the trailer, the pulling vehicle, and/or a second vehicle that may be coupled to the vehicle to maintain proper spacing between the sources. Initially, the sources and land streamer 103 are pulled into position and a shot gather is obtained when each of the shots is fired. The sources and land streamer 103 is pulled to the next source location and additional shot gathers are obtained as the shots are fired. The spacing between source locations should be such that the source locations for the shots should approximately overlap to allow the data to be joined as discussed above to extend the effective length of the land steamer 103.

Three dimensional (3D) imaging may also be performed using land streamers 103. For example, a plurality of land streamers 103 may be pulled in parallel and/or a plurality of sources that are not in-line with the land streamer 103 may be used to acquire data to generate a 3D subsurface image. In one embodiment, among others, a plurality of sources may be positioned in a grid pattern with fixed distances between the sources. For instance, two or more parallel rows of two (or more) sources can be separated by a fixed distance. One or more land streamers 103 can be positioned in-line with one or more of the rows of sources. The sources and land streamer(s) 103 are pulled into position and a shot gather is obtained when each of the shots is fired. The sources and land streamer(s) 103 are pulled to the next source locations and additional shot gathers are obtained as the shots are fired. The spacing between source locations should be such that the source locations for the shots should approximately overlap to allow the data to be joined as discussed above to extend the effective length of the land steamer 103. In other embodiments, a plurality of land streamers 103 may be pulled in parallel behind a single row of two or more sources and shot gathers obtained when the shots are fired.

Data can be obtained from the receivers using a seismic recording system (e.g., a Geometrics Geode recording system) coupled to the receivers through a plurality of channels. A computing device such as, e.g., a laptop, tablet or smart phone can be used to control coordination of the shots and the shot gather. The computing device can interface with the seismic recording system though a wireless or wired connection. The shot gather can be recorded and stored in memory for analysis. In some implementations, real time analysis of the captured data may be carried out by the computing device and/or the seismic recording system. In other embodiments, the data may be transmitted to a remote location for storage and/or analysis using a cellular or satellite data connection. Position information can also be recorded and stored or transmitted with the shot gather.

In some implementations, the vehicle(s) moving the land streamer 103 and/or the source(s) may be guided by a global positioning system (GPS) and/or differential GPS along a survey route. In some cases, the vehicle(s) may be automated to drive themselves along the survey route using the GPS information. Position and/or distance may be maintained between vehicles, land streamers, and/or sources using the GPS location information. In addition, the source(s) may be automated using the GPS information to initiate shots at the appropriate locations. Coordination of the data acquisition may also be controlled based at least in part upon the GPS information. For example, the vehicles may be moved and, when in appropriate positions, the survey data may be automatically acquired. In this way, only a few operators may be needed to control gathering of the survey data with a fleet of source and/or streamer vehicles.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for seismic surveying, comprising:
   a land streamer including a plurality of receivers spaced between a proximal end and a distal end of the land streamer, the plurality of receivers comprising a proximal end receiver located at the proximal end of the land streamer and a distal end receiver located at the distal end of the land streamer;
   a first shot source located in-line with the plurality of receivers and adjacent to the proximal end receiver of the land streamer, where the land streamer has a fixed overall length from the first shot source to the distal end receiver of the land streamer; and
   a second shot source located in-line with the plurality of receivers of the land streamer and the first shot source, where the second shot source is located on a side of the first shot source opposite the proximal end of the land streamer and separated from the first shot source by the fixed overall length.

2. The system of claim 1, further comprising a third shot source located in-line with the plurality of receivers of the land streamer, the first shot source and the second shot source, where the third shot source is located on a side of the second shot source opposite the first shot source and separated from the second shot source by the fixed overall length.

3. The system of claim 1, wherein the land streamer, the first shot source, and the second shot source are configured to maintain alignment and separation while being displaced.

4. The system of claim 3, further comprising a seismic recording system configured to record a first shot gather from the plurality of receivers in response to firing the second shot source at a source location.

5. The system of claim 4, wherein the seismic recording system is communicatively coupled to the plurality of receivers through a plurality of channels.

6. The system of claim 4, wherein the seismic recording system is further configured to record a second shot gather from the plurality of receivers in response to firing the first shot source at the source location, where the second shot source, the first shot source, and the land streamer are linearly displaced by the fixed overall length to position the first shot source at the source location while maintaining the alignment and separation of the second shot source, the first shot source, and the plurality of receivers of the land streamer, and where an extended shot gather comprises the first shot gather concatenated with the second shot gather.

7. The system of claim 6, further comprising a vehicle that displaces the second shot source, the first shot source, and the land streamer along a predefined survey route.

8. The system of claim 7, wherein the displacement of the second shot source, the first shot source, and the land streamer by the vehicle is guided by a global positioning system (GPS).

9. The system of claim 4, further comprising a computing device configured to control firing of the first and second shot sources and data acquisition by the seismic recording system.

10. The system of claim 3, wherein the plurality of receivers are secured together at even intervals between the proximal end and the distal end of the land streamer.

11. The system of claim 2, further comprising a seismic recording system configured to record a first shot gather from the plurality of receivers in response to firing the third shot source at a source location.

12. The system of claim 11, wherein the seismic recording system is further configured to record a second shot gather from the plurality of receivers in response to firing the second shot source at the source location, where the third shot source, the second shot source, the first shot source, and the land streamer are linearly displaced by the fixed overall length to position the second shot source at the source location while maintaining the alignment and separation of the third shot source, the second shot source, the first shot source, and the plurality of receivers of the land streamer.

13. The system of claim 12, wherein the seismic recording system is further configured to record a third shot gather from the plurality of receivers in response to firing the first shot source at the source location, where the third shot source, the second shot source, the first shot source, and the land streamer are linearly displaced by the fixed overall length to position the first shot source at the source location while maintaining the alignment and separation of the second shot source, the first shot source, and the plurality of receivers of the land streamer.

14. The system of claim 13, wherein an extended shot gather comprises the first shot gather, the second shot gather and the third shot gather, which are concatenated together.

15. The system of claim 1, wherein the first shot source and the second shot source are sequentially fired to obtain corresponding shot gathers using the plurality of receivers without displacement of the land streamer.

* * * * *